(12) United States Patent
Shen et al.

(10) Patent No.: US 7,699,097 B2
(45) Date of Patent: Apr. 20, 2010

(54) MOVER STABILIZING AND STATOR COOLING ARRANGEMENT OF A 3-PHASE LINEAR MOTOR OF A SUBMERSIBLE OIL PUMP

(75) Inventors: Kuei-Hsien Shen, Hsichih (TW); Chinn-Chann Chiang, Hsichih (TW)

(73) Assignee: Digitek Technology Co., Ltd., Taipei County (TW)

( * ) Notice: Subject to any disclaimer, the term of this patent is extended or adjusted under 35 U.S.C. 154(b) by 81 days.

(21) Appl. No.: 12/155,851

(22) Filed: Jun. 11, 2008

(65) Prior Publication Data

US 2009/0308591 A1    Dec. 17, 2009

(51) Int. Cl.
| | |
|---|---|
| *E21B 36/00* | (2006.01) |
| *E21B 43/00* | (2006.01) |
| *E21B 43/24* | (2006.01) |
| *F04B 35/04* | (2006.01) |
| *F04B 53/00* | (2006.01) |
| *H02K 41/02* | (2006.01) |
| *H02K 7/06* | (2006.01) |

(52) U.S. Cl. ............... 166/62; 166/57; 166/68.5; 166/105; 166/302; 417/417; 417/555.2; 310/12.29; 310/12.33; 310/24

(58) Field of Classification Search ............... 166/57, 166/302, 105, 68.5; 417/417, 555.2; 310/12.29, 310/12.31, 12.33, 14, 24

See application file for complete search history.

(56) References Cited

U.S. PATENT DOCUMENTS

| 3,426,855 | A | * | 2/1969 | Koot et al. | ............... 173/197 |
| 5,068,554 | A | * | 11/1991 | Mohn | ............... 310/12.04 |
| 7,199,497 | B2 | * | 4/2007 | Tessier et al. | ............... 310/90 |

\* cited by examiner

*Primary Examiner*—David J Bagnell
*Assistant Examiner*—Catherine Loikith
(74) *Attorney, Agent, or Firm*—Rosenberg, Klein & Lee

(57) ABSTRACT

A mover stabilizing and stator cooling arrangement includes an upper sleeve surrounding the mover of the linear motor, a lower sleeve, a thermoconducting sleeve surrounding the stator and axially connected between the upper sleeve and the lower sleeve. The arrangement further includes a thermal grease filled in the space defined between the upper sleeve and the mover, the space defined between the thermoconducting sleeve and the stator, and the space defined between the lower sleeve and the outer tube for quick dissipation of waste heat. A stabilizer ring is set between the upper sleeve and the mover to stabilize axial movement of the mover. A piston and multiple one-way valve sets are mounted in the space between the lower sleeve and the outer tube for allowing adjustment of the volume in the thermoconducting sleeve responsive to expansion/contraction of the thermal grease due to temperature changes.

1 Claim, 2 Drawing Sheets

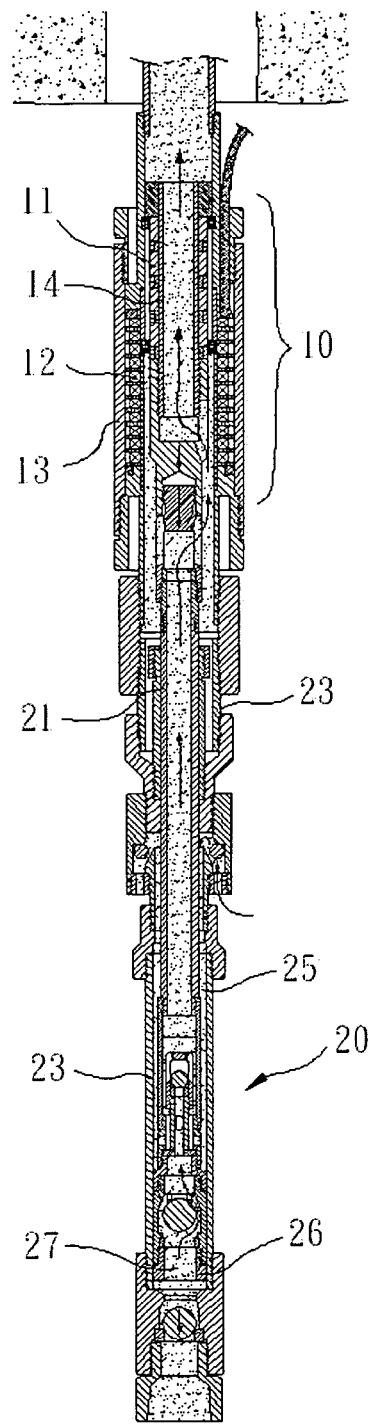
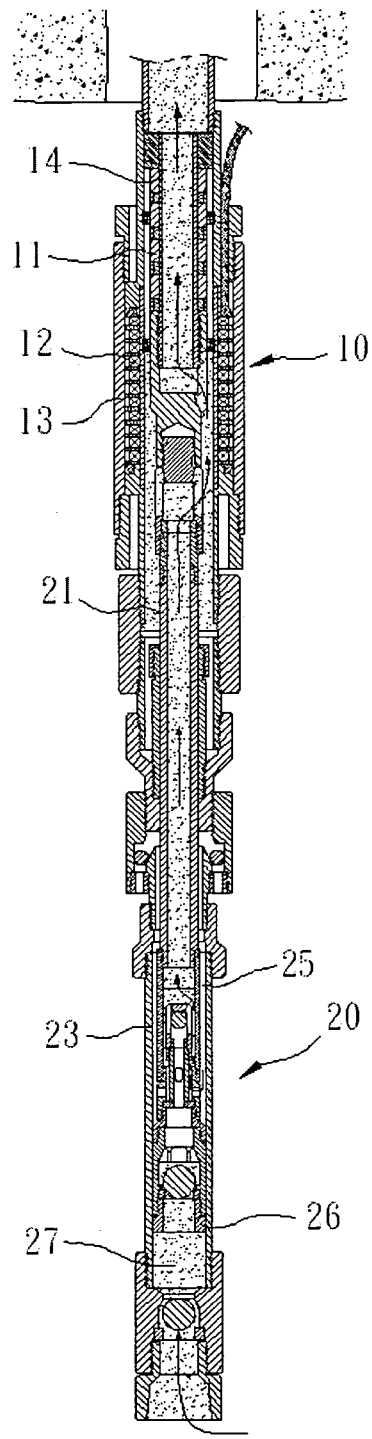
FIG. 1
PRIOR ART
FIG. 2
PRIOR ART

MOVER STABILIZING AND STATOR COOLING ARRANGEMENT OF A 3-PHASE LINEAR MOTOR OF A SUBMERSIBLE OIL PUMP

BACKGROUND OF THE INVENTION

1. Field of the Invention

The present invention relates to a crude oil production system and more specifically, to a mover stabilizing and stator cooling arrangement used in a 3-phase linear motor of a submersible oil pump to stabilize reciprocating movement of the mover and to dissipate heat from the stator during operation of the motor.

2. Description of the Related Art

The best way to dissipate heat during operation of a motor is the utilization of natural air convection. Electric fan may be used to provide forced air, enhancing heat dissipation.

U.S. Pat. No. 7,316,270 discloses an oil pumping unit using a submersible oil pump driven by a synchronizing three-phase linear motor. According to this design, the oil pumping unit comprises a motor 10 and a pump 20. The motor 10 comprises a casing 13, a stator 12, and a mover 11. The mover 11 comprises a center tube 14. The pump 20 comprises a barrel 23, a suction pipe 21, an upper chamber 25, a piston 26, and a lower chamber 27. The suction pipe 21 is connected to the mover 11 for synchronous reciprocation to suck in a fluid from the oil well.

According to this design, natural air or forced air cannot reach the inside of the linear motor 10 to dissipate heat from the linear motor 10. When the pump is pumping the fluid, the running fluid passing through the center tube 14 carries heat away from the mover 11. However, the air gap between the mover 11 and the stator 12 does not transfer heat easily, therefore heat tends to be accumulated at the stator 12. Further, the mover 11 of the linear motor 10 is relatively quite long, therefore off axial motion can easily happen during its reciprocating motion. An improvement is necessary to facilitate heat dissipation of the stator 12 and to stabilize the axial reciprocating motion of the mover 11.

SUMMARY OF THE INVENTION

It is one object of the present invention to provide a mover stabilizing and stator cooling arrangement, which is practical for use in 3-phase linear motor of a submersible oil pump to effectively stabilizing axial reciprocating motion of the mover of the linear motor and to efficiently dissipate heat from the stator during operation of the linear motor.

To achieve this and other objects of the present invention, the mover stabilizing and stator cooling arrangement is used in a 3-phase linear motor of a submersible oil pump, comprising an upper sleeve concentrically surrounding the mover of the linear motor, a lower sleeve, a thermoconducting sleeve concentrically surrounding the stator and axially connected between the upper sleeve and the lower sleeve, a thermal grease filled in the space defined between the upper sleeve and the mover and the space defined between the thermoconducting sleeve and the stator and the space defined between the lower sleeve and the outer tube for quick heat dissipation, and a stabilizer ring set between the upper sleeve and the mover to stabilize axial movement of the mover.

Further, a piston and multiple one-way valve sets mounted in the space defined between the lower sleeve and the outer tube for allowing adjustment of the volume in the thermoconducting sleeve subject to expansion/contraction of the thermal grease during temperature change.

BRIEF DESCRIPTION OF THE DRAWINGS

FIG. 1 is a schematic sectional view, showing a down-stroke oil pumping action of a 3-phase linear motor-driven submersible oil pump of a crude oil production system according to the prior art.

FIG. 2 corresponds to FIG. 1, showing an up-stroke oil pumping action of the 3-phase linear motor-driven submersible oil pump of the crude oil production system according to the prior art.

DETAILED DESCRIPTION OF THE PREFERRED EMBODIMENT

Figures 3, 4:
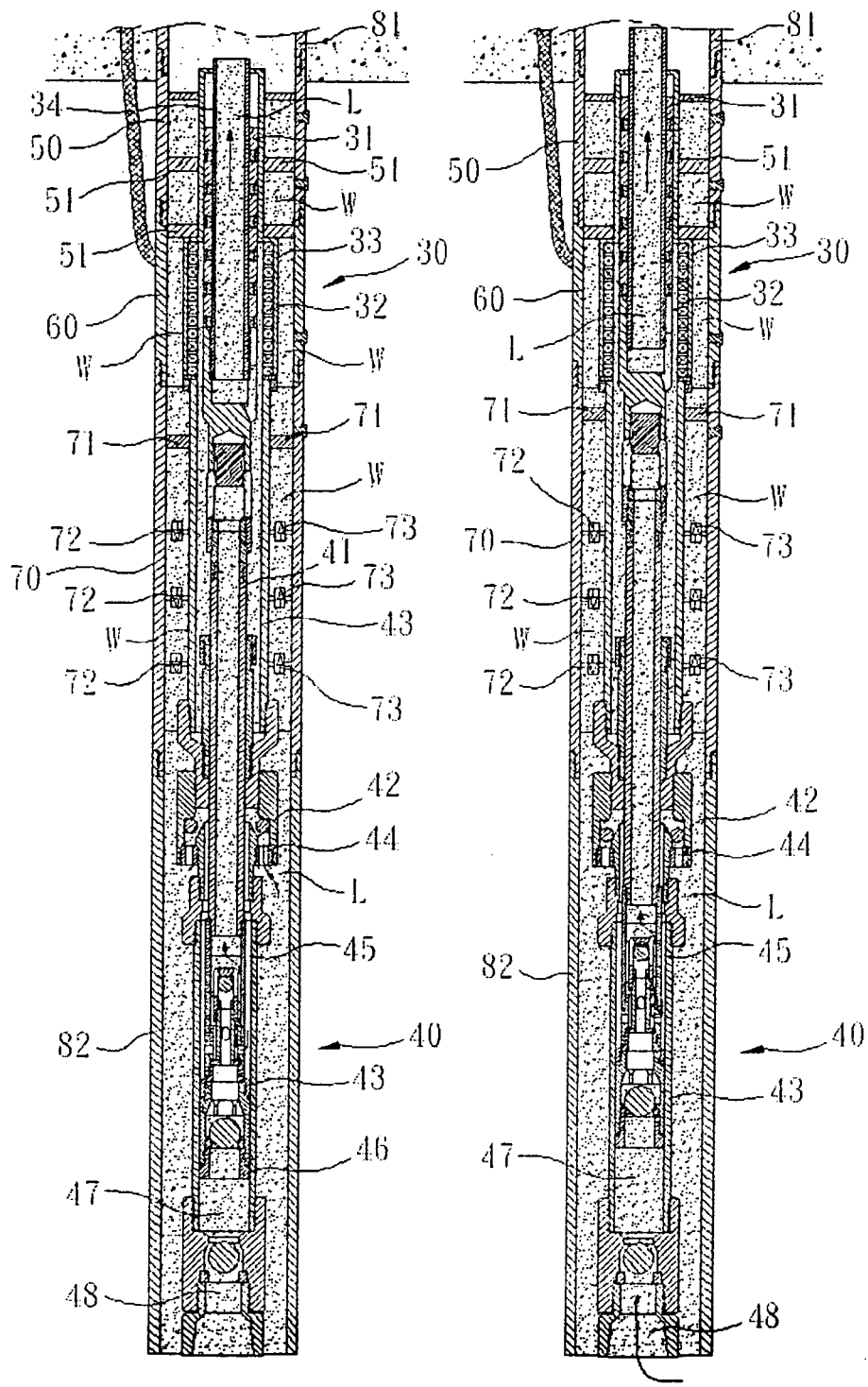
FIG. 3 is a schematic sectional view, showing a down-stroke oil pumping action of a 3-phase linear motor-driven submersible oil pump of a crude oil production system according to the present invention.
FIG. 4 corresponds to FIG. 3, showing an up-stroke oil pumping action of the 3-phase linear motor-driven submersible oil pump of the crude oil production system according to the present invention.

Referring to FIG. 3, a linear motor 30 is shown comprised of a mover 31, a stator 32, and a casing 33. The mover 31 is movable up and down in the stator 32. The mover 31 comprises a center tube 34. A pump 40 is shown comprised of a suction tube 41, an outer tube 43, an upper chamber 45, a pump piston 46, and a lower chamber 47. The suction tube 41 is connected to the mover 31 of the linear motor 30 for synchronous up/down movement with the mover 31 and for transportation of the fluid upward through the center tube 34.

Referring to FIG. 3 again, an upper sleeve 50 surrounds the mover 31 of the linear motor 30. A thermoconducting sleeve 60 surrounds the stator 32. A lower sleeve 70 is axially connected to the bottom end of the thermoconducting sleeve 60. The space defined between the upper sleeve 50 and the mover 31 is filled with a thermal grease W. A stabilizer ring 51 is set between the upper sleeve 50 and the mover 31 to stabilize axial movement of the mover 31. The thermoconducting sleeve 60 is axially connected to the bottom end of the upper sleeve 50. The thermoconducting sleeve 60 surrounds the stator 32 in a concentric manner. The space defined between the thermoconducting sleeve 60 and the stator 32 is filled with a thermal grease W. The bottom end of the thermoconducting sleeve 60 is axially connected to the top end of the lower sleeve 70. The lower sleeve 70 surrounds the outer tube 43. The space defined between the lower sleeve 70 and the outer tube 43 is filled with a thermal grease W. A piston 71 and multiple valve sets each comprised of a downward one-way valve 72 and an upward one-way valve 73 are mounted in the space defined between the lower sleeve 70 and the outer tube 43. The upper sleeve 50 and the top end of the lower sleeve 70 stabilize axial movement of the mover 31 and the suction tube 41. The thermal grease W in the thermoconducting sleeve 60 dissipates heat from the stator 32 rapidly. The piston 71 and the multiple valve sets of downward one-way valves 72 and upward one-way valves 73 in the lower sleeve 70 control the space volume inside the thermoconducting sleeve 60 subject to the volume change of thermal grease W in the thermoconducting sleeve 60 that expands when hot and contracts when cold.

Referring to FIG. 3 again, when the mover 31 moves downwards, the suction tube 41 and the pump piston 46 are moved downwards by the mover 31, and the one-way valve, referenced by 42, is opened, and the fluid L in the oil well is pumped upwards from the oil well through the upper crude oil inlet, referenced by 44, into the upper chamber 45, and at the same time the fluid L in the lower chamber 47 is forced upwards to the suction tube 41 and then the center tube 34 to the top oil pipe, referenced by 81, which goes up to the ground surface.

Referring to FIG. 4, when the mover 31 moves upwards, the suction tube 41 and the pump piston 46 are moved upwards by the mover 31, and the one-way valve in the upper crude oil inlet 44 is closed, and therefore the fluid L in the upper chamber 45 is forced upwards through the suction tube 41 and then the center tube 34 to the top oil pipe, referenced by 81, which goes up to the ground surface. At the same time, the fluid L in the oil well is pumped upwards through the bottom oil pipe 82 into the lower chamber 47 via the lower crude oil inlet, referenced by 48.

Referring to FIGS. 3 and 4 again, the upper sleeve 50 and the mover 31 are arranged in a concentric manner. The stabilizer ring 51 is set between the upper sleeve 50 and the mover 31 to stabilize axial movement of the mover 31. The thermal grease W filled in the space defined between the upper sleeve 50 and the mover 31 stabilizes the mover 31 and enhances heat dissipation from the mover 31.

Referring to FIGS. 3 and 4 again, the thermoconducting sleeve 60 is axially connected between the upper sleeve 50 and the top end of the lower sleeve 70, and surrounds the stator 32 in a concentric manner. Further, the space defined between the thermoconducting sleeve 60 and the stator 32 and the space defined between the lower sleeve 70 and the outer tube 43 are filled with a thermal grease W. Because the linear motor 30 is submerged in the crude oil in the oil well, it is not possible to carry heat away from the stator 32 and mover 31 of the linear motor 30 by means of natural air or forced air during the operation of the linear motor 30. However, the fluid L that flows upwards through the suction tube 41 and the center tube 34 to the top oil pipe 81 carries heat away from the mover 31 rapidly; the thermal grease W that is filled in the space defined between the thermoconducting sleeve 60 and the stator 32 transfers heat from the stator 32 to the fluid L in the oil well outside the thermoconducting sleeve 60.

Further, as stated above, the piston 71 and the one way valve sets (there are three valve sets used in the present preferred embodiment) each comprised of a downward one-way valve 72 and an upward one-way valve 73 are mounted in the space that is defined between the lower sleeve 70 and the outer tube 43 and filled with the thermal grease W. The space volume between piston 71 and the one way valve set below it and the space volumes between valve sets form buffer chambers. The valve sets are strong enough to sustain the weight of the thermal grease W inside the buffer chamber. During operation of the linear motor 30, heat is dissipated from the stator 32 into the thermal grease W, and the temperature of the thermal grease W is relatively increased. When getting hot, the thermal grease W expands to force the piston 71 downwards. As a result, the space volume of the buffer chamber below piston 71 is reduced and part of the thermal grease W therein is consecutively forced through downward one-way valve 72 into the lower buffer chambers and eventually into the bottom oil pipe 82. When the speed of the linear motor 30 is reduced or when the linear motor 30 is stopped, the temperature of the thermal grease W is relatively reduced. When getting cold, the thermal grease W contracts, causing the piston 71 to move upwards, and therefore the thermal grease W flows backwards from the bottom oil pipe 82 into the lower sleeve 70 and from the lower sleeve 70 into the thermoconducting sleeve 60, i.e., the volume inside the thermoconducting sleeve 60 is automatically adjusted to fit the volume of the thermal grease W that expands when hot and contracts when cold.

Further, when the thermal grease W flows back upwards some of the fluid L will get into the lowest buffer chamber. The thermal grease W has a specific gravity smaller than that of the fluid L in the oil well, so that the fluid L entering the lowest buffer chamber from the bottom oil pipe 82 during contraction of the thermal grease W will stay at the bottom of the lowest buffer chamber avoiding mixing of the fluid L with the thermal grease W.

In conclusion, the invention has the following features and advantages:

1. Enhancing Stabilization of the Operation:

As illustrated in FIGS. 3 and 4, the upper sleeve 50 and the lower sleeve 70 surround the mover 31 and the pump 40, supporting stable axial movement of the mover 31 and the suction tube 41, and therefore the mover 31 does not wear quickly with use due to off axial motion.

2. Better Heat Dissipation Performance:

As shown in FIGS. 3 and 4, during operation of the motor 30 and the pump 40, the thermal grease W in the upper sleeve 50 stabilize reciprocating movement of the mover 31; the thermal grease W in thermoconducting sleeve 60 and the thermoconducting sleeve 60 transfer heat from the stator 32 to the outside fluid L in the oil well. The piston 71 and one-way valves sets each of which is comprised of an upward one-way valve 73 and a downward one-way valve 72 divide the space between the lower sleeve 70 and the outer tube 43 into multiple buffer chambers so that the volume of the thermoconducting sleeve 60 is automatically adjusted subject to the expansion and contraction of the thermal grease W during change of temperature.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A mover stabilizing and stator cooling arrangement used in a 3-phase linear motor of a submersible oil pump of a crude oil production system, said linear motor being comprised of a mover, a stator and a casing, said mover comprising a center tube and being movable up and down in said stator, said pump being comprised of a suction tube, an outer tube, an upper chamber, a pump piston and a lower chamber, said suction tube being connected to said mover for synchronous up/down movement for fluid transportation upward through center tube of the mover, mover stabilizing and stator cooling arrangement comprising an upper sleeve concentrically surrounding said mover of said linear motor;

a lower sleeve;

a thermoconducting sleeve concentrically surrounding said stator and axially connected between said upper sleeve and said lower sleeve;

a thermal grease filled in the space defined between said upper sleeve and said mover and the space defined between said thermoconducting sleeve and said stator and the space defined between said lower sleeve and said outer tube;

a stabilizer ring set between said upper sleeve and said mover to stabilize axial movement of said mover, and a piston and multiple valve sets mounted in the space defined between said lower sleeve and said outer tube, each said valve set comprised of a downward one-way valve and an upward one-way valve.

* * * * *